US012110104B2

(12) United States Patent
Breon et al.

(10) Patent No.: US 12,110,104 B2
(45) Date of Patent: Oct. 8, 2024

(54) METHOD OF STABILIZING ARTICULATED ROTOR BLADE

(71) Applicant: LOCKHEED MARTIN CORPORATION, Bethesda, MD (US)

(72) Inventors: Joshua A. Breon, Lafayette, IN (US); Eric S. Parsons, Middlebury, CT (US); Christopher M. Sutton, Milford, CT (US); William Paul Adams, Norwalk, CT (US); Timothy James Conti, Shelton, CT (US); Jared Anapolle, Stratford, CT (US); Evan Medrano, Stratford, CT (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 0 days.

(21) Appl. No.: 17/900,780

(22) Filed: Aug. 31, 2022

(65) Prior Publication Data
US 2024/0067333 A1     Feb. 29, 2024

(51) Int. Cl.
*B64C 27/467*     (2006.01)
*B64C 27/473*     (2006.01)

(52) U.S. Cl.
CPC .......... *B64C 27/467* (2013.01); *B64C 27/473* (2013.01)

(58) Field of Classification Search
None
See application file for complete search history.

(56) References Cited

U.S. PATENT DOCUMENTS

| 3,065,799 A | 11/1962 | McCarty |
| 3,323,597 A | 6/1967 | Longobardi et al. |
| 3,528,753 A | 9/1970 | Dutton et al. |
| 4,130,377 A * | 12/1978 | Blackwell, Jr. ........ B64C 27/463 |
| | | 416/138 |
| 10,239,604 B2 * | 3/2019 | Foskey .................. B64C 11/24 |
| 2017/0334548 A1 * | 11/2017 | Foskey .................. B64C 11/26 |

OTHER PUBLICATIONS

U.S. Appl. No. 17/485,192, filed Sep. 24, 2021, Lockheed Martin Corporation.

* cited by examiner

*Primary Examiner* — Juan G Flores
(74) *Attorney, Agent, or Firm* — Foley & Lardner LLP

(57) ABSTRACT

A rotor blade for a rotary wing aircraft includes a leading edge and a trailing edge defining a chordwise direction. The leading edge defines a forward end of the rotor blade and the trailing edge defines an aft end of the rotor blade. The rotor blade has a center of gravity and an aerodynamic center along the chordwise direction. The center of gravity is aft of the aerodynamic center.

13 Claims, 5 Drawing Sheets

Prior Art

METHOD OF STABILIZING ARTICULATED ROTOR BLADE

BACKGROUND

The present invention relates generally to the field of rotor blade design for rotary wing aircraft.

Rotor blades for rotary wing aircraft, such as helicopters, rotate to generate lift for vertical takeoff and flight. Reduction of the weight of rotor blades can reduce manufacturing cost and increase the payload of the aircraft.

SUMMARY OF THE INVENTION

In an exemplary aspect, a rotor blade for a rotary wing aircraft is provided. The rotor blade includes a leading edge and a trailing edge defining a chordwise direction, the leading edge defining a forward end of the rotor blade and the trailing edge defining an aft end of the rotor blade. The rotor blade has a center of gravity and an aerodynamic center along the chordwise direction, wherein the center of gravity is aft of the aerodynamic center.

In a further exemplary aspect, a spar for a rotor blade of a rotary wing aircraft is provided. The spar includes an upper portion including an upper forward portion having a first thickness and an upper aft portion having a second thickness. The spar further includes a lower portion including a lower forward portion having a third thickness and a lower aft portion having a fourth thickness. The first thickness is larger than the second thickness, and the third thickness is larger than the fourth thickness.

In yet a further exemplary aspect, a rotor blade for a rotary wing aircraft is provided. The rotor blade includes a spar and a leading edge sheath coupled to the spar, the leading edge sheath and the spar forming a cavity therebetween. The cavity is structured to extend at least from an inboard portion of the rotor blade to an outboard portion of the rotor blade.

It will be recognized that the Figures are schematic representations for purposes of illustration. The Figures are provided for the purpose of illustrating one or more implementations with the explicit understanding that the Figures will not be used to limit the scope of the meaning of the claims.

DETAILED DESCRIPTION

Following below are more detailed descriptions of various concepts related to, and implementations of, methods and apparatuses for providing a dynamically stable rotor blade with an aerodynamic center forward of the center of gravity. The various concepts introduced above and discussed in greater detail below may be implemented in any of a number of ways, as the described concepts are not limited to any particular manner of implementation. Examples of specific implementations and applications are provided primarily for illustrative purposes.

Traditional rotor blades are designed with a center of gravity that is closer to the leading edge than the aerodynamic center (i.e., forward of the aerodynamic center) in order to provide dynamic stability to the blades and rotor system during flight. Dynamic stability refers to the tendency of the blade to return to an equilibrium position once moved from that position by, for example, aerodynamic forces. A dynamically unstable blade tends to oscillate with increasing amplitude once moved from an equilibrium position. This can result in undesirable vibration and/or harmonic motion of the blades that may affect or impair safe operation of the aircraft. The center of gravity (e.g., the center of mass) refers to the average position of the mass of the rotor blade. The aerodynamic center refers to the point at which the pitching moment of the blade does not substantially vary with the angle of attack of the blade. In order to shift the center of gravity forward, typical blades are designed with a heavy weight at the leading edge, typically made of lead and/or tungsten. As noted above, a reduction in rotor blade weight can result in reduced manufacturing costs and higher aircraft payload. Accordingly, it would be advantageous to provide a lighter, dynamically stable rotor blade that does not require a heavy weight at the leading edge.

The exemplary non-limiting embodiments described herein provide a dynamically stable rotor blade with a center of gravity that is closer to the trailing edge than the aerodynamic center (i.e., aft of the aerodynamic center). This is achieved by designing the rotor blade with a shear center that is forward of the aerodynamic center. Shear center refers to the point at which force applied to the blade does not cause torsion. In various embodiments, the spar of the blade is thicker on the forward end than on the aft end such that the shear center is forward of the aerodynamic center. For example, the spar may be a multiple ply construction, with more plies on the forward end than on the aft end.

Figure 1:
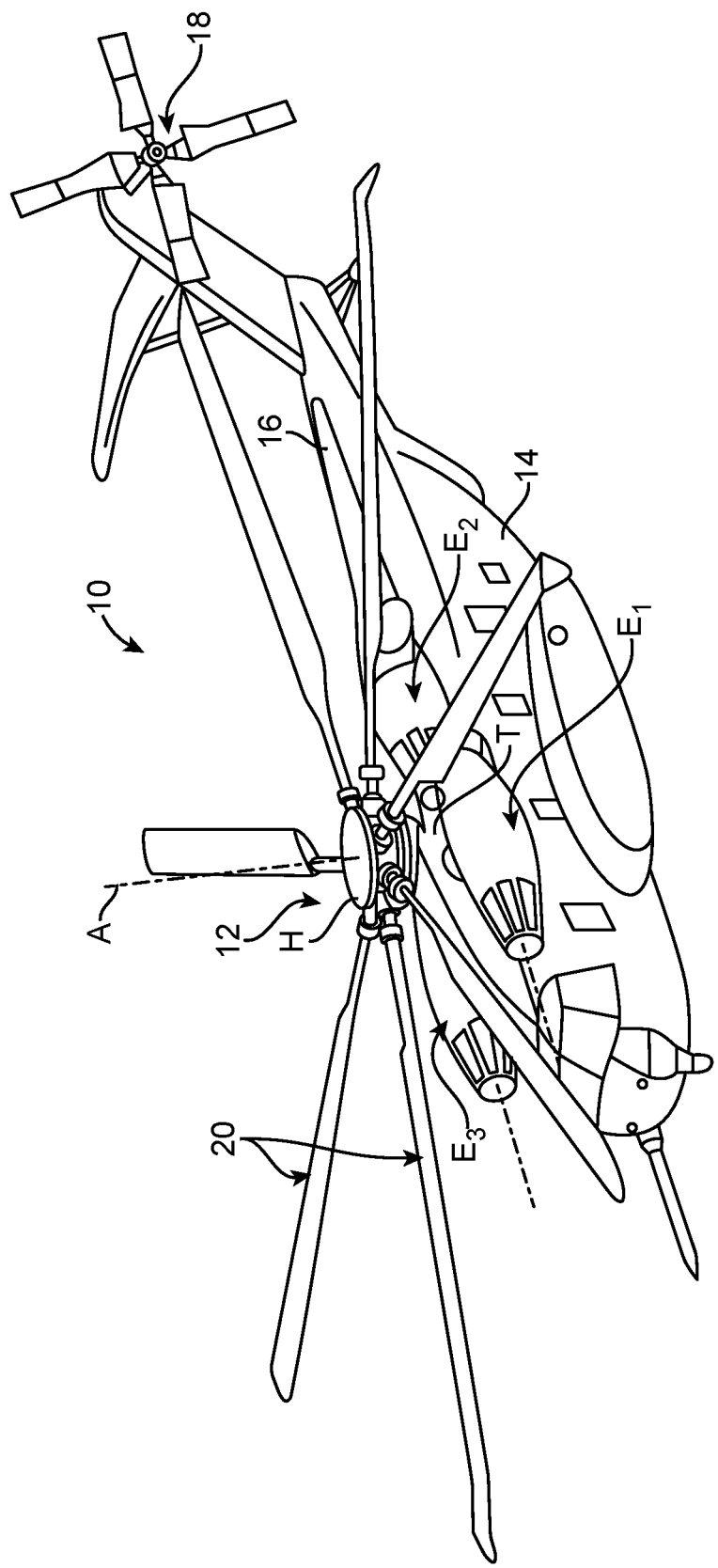
FIG. 1 is a perspective view of a rotary wing aircraft.

Referring to FIG. 1, an example of a vertical takeoff and landing (VTOL) rotary-wing aircraft 10 having a main rotor system 12, such as a helicopter, is illustrated. As shown, the aircraft 10 includes an airframe 14 having an extending tail 16, which mounts a tail rotor system 18, such as an anti-torque system. The main rotor system 12 is driven about an axis of rotation A via a main gearbox, illustrated schematically at T, by one or more engines, illustrated at E1-E3. The main rotor system 12 includes a plurality of rotor blades 20 mounted to a rotor hub assembly H. The rotor blades 20 may be rotor blades in accordance with the embodiments described herein. Although a particular helicopter configuration is illustrated and described herein, other configurations and/or aircraft may be utilized in connection with the concepts described herein. For example, the techniques according to the present disclosure may be implemented in a variety of aircraft, including a high speed compound rotary wing aircraft with supplemental translational thrust systems, a dual contra-rotating rotary aircraft, coaxial rotor system aircraft, a tilt-rotor aircraft, and a tilt-wing aircraft.

Figure 2:
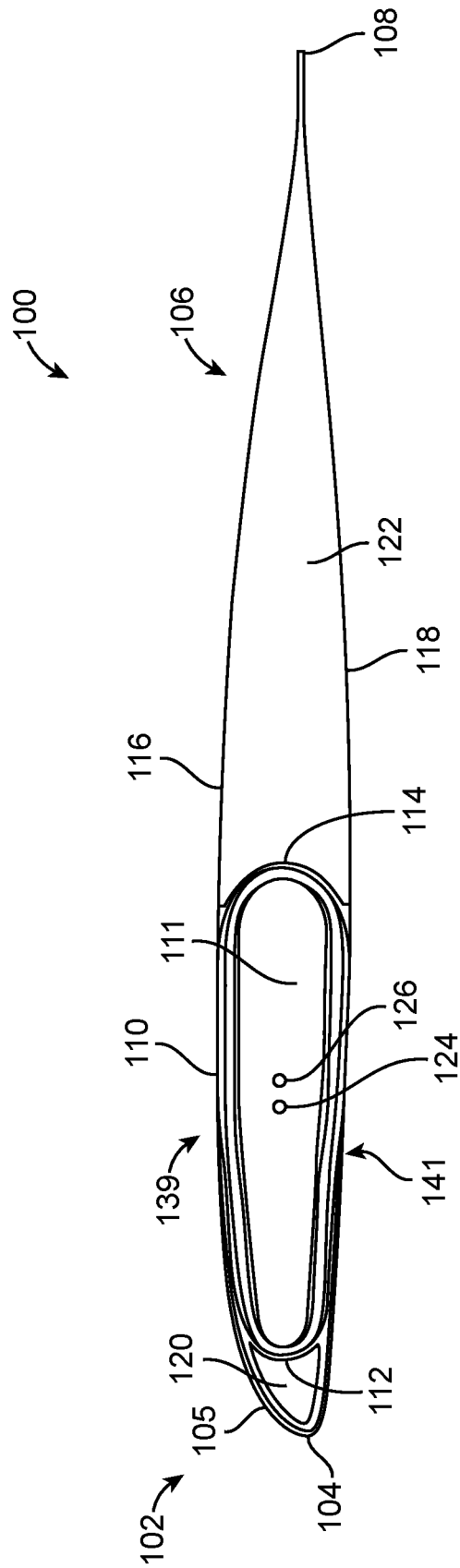
FIG. 2 is cross-sectional view of a conventional rotor blade of a rotary wing aircraft.

Referring to FIG. 2, a cross section of a conventional rotor blade 100 is illustrated. The rotor blade 100 includes a leading edge portion 102 including a leading edge 104 (e.g., a forward edge) that defines a forward end of the rotor blade 100, and a trailing edge portion 106 including a trailing edge 108 (e.g., an aft edge) that defines an aft end of the rotor blade 100. The primary structural member is a spar 110, the cross section of which is roughly oval (e.g., substantially ovate) in shape. The spar 110 also includes a leading edge 112 (e.g., a forward edge), and a trailing edge 114 (e.g., an aft edge). The spar 110 extends from the root to the tip of the blade 100. The spar 110 defines an internal cavity 111 that may be filled with a lightweight material such as foam, or may not be filled at all. The outer surface of the rotor blade 100 includes an upper skin 116 and a lower skin 118 that are bonded to the spar 110 and extend to the trailing edge portion 106 to form the trailing edge 108, as well as a leading edge sheath 105 at the leading edge portion 102 that forms the leading edge 104. The trailing edge portion 106 includes a lightweight core 122 positioned between the upper and lower skins 116, 118 and the trailing edge 214 of the spar, that may comprise, for example, a lightweight foam or lightweight honeycomb structure.

The leading edge portion 102 of the blade 100 includes a forward weight 120 positioned between the upper and lower skins 116, 118 and the leading edge of the spar 112. Because the internal cavity 111 of the spar 110 and the core 122 of the trailing edge portion 106 include lightweight material or no material at all, the forward weight 120 ensures that, chordwise, the center of gravity 124 is forward of the aerodynamic center 126 of the blade 100. This provides dynamic stability to the blade 100 and the rotor system during flight. The forward weight 120 may be made from, for example, lead or tungsten, and may comprise as much as approximately half of the total weight of the rotor blade 100. For example, a conventional blade may have a total weight of approximately 250 lbs. and a forward weight of approximately 125 lbs.

Figure 3:
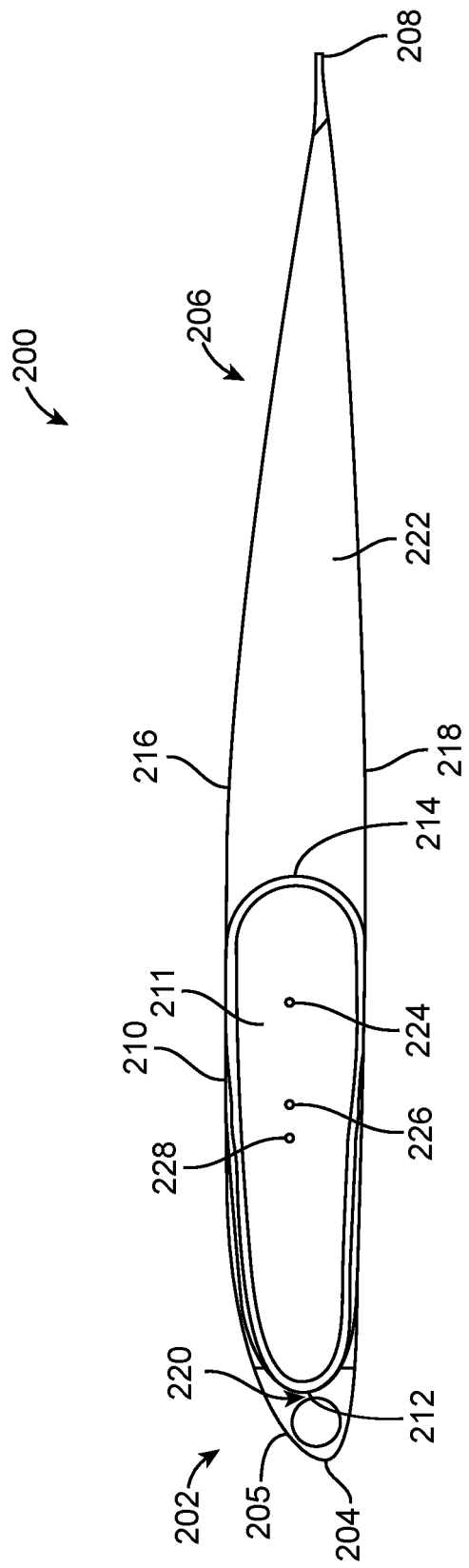
FIG. 3 is a cross-sectional view of a rotor blade of a rotary wing aircraft, according to an exemplary embodiment.

Referring to FIG. 3, a cross section of a rotor blade 200, in accordance with an exemplary embodiment, is illustrated. Like the conventional rotor blade 100, the rotor blade 200 includes a leading edge portion 202 including a leading edge 204 (e.g., a forward edge) that defines a forward end of the rotor blade, and a trailing edge portion 206 including a trailing edge 208 (e.g., an aft edge) that defines an aft edge of the rotor blade. The rotor blade 200 includes a spar 210, the cross section of which is roughly oval in shape. The spar 210 also includes a leading edge 212 (e.g., a forward edge) defining a forward end of the spar 210, and a trailing edge 214 (e.g., an aft edge) defining an aft end of the spar. The spar 210 begins at the inboard root of the rotor blade 200 and extends most of the way to the outboard tip of the rotor blade 200. The spar 210 defines an internal cavity 211 that may be filled with a lightweight material such as foam, or may remain an empty space. The outer surface of the rotor blade 200 includes an upper skin 216 and a lower skin 218 that are bonded to the spar 210 and extend to the trailing edge portion 206 to form the trailing edge 208, as well as a leading edge sheath 105 at the leading edge portion 202 that forms the leading edge 204. The spar 210 and upper and lower skins 216, 218 may be made from titanium, aluminum, stainless, steel, carbon fiber, fiberglass, or any other appropriate material. In some embodiments, the spar 210 and/or the upper and lower skins 216, 218 may be made from a multifilament graphite having a typical filament tensile modulus of approximately $38 \times 10^6$ to approximately $42 \times 10^6$ psi (approximately 262 to approximately 290 GPa) and a typical filament tensile strength of approximately 660,000 psi (approximately 4452 MPa). The trailing edge portion 206 includes a lightweight core 222 positioned between the upper and lower skins 216, 218 and the trailing edge 214 of the spar, that may be made from, for example, a lightweight foam or a lightweight honeycomb type structure.

The rotor blade 200 does not include a forward weight positioned between the spar 210 and the leading edge 204 of the rotor blade 200. Instead, the leading edge portion 202 of the blade 200 includes a cavity 220. The cavity 220 may be filled with a lightweight material such as foam, may remain an empty space, or may include conduit for running electrical wiring to the outboard end of the rotor blade 200. For example, wire harness assemblies that can be implemented within a conduit in the cavity 220, as well as additional structural details of any electrical connections, can be found in U.S. patent application Ser. No. 17/485,192 filed Sep. 24, 2021, the entirety of which is incorporated by reference herein for the techniques and aerodynamic concepts discussed therein. In some embodiments, the cavity 220 is configured to house a wire harness extending through an inner portion of a conduit, which is also housed in the cavity 220. The cavity 220 extends from at least an inboard portion to at least an outboard portion of the rotor blade 200, and the conduit extends from the inboard to the outboard portion. The wire harness is configured to electrically couple an electrical component at the outboard portion of the rotor blade to an electrical component at the inboard end of the rotor blade 200. In some embodiments, a filler block holds the conduit within the cavity 220.

Because the rotor blade 200 does not have a forward weight, the center of gravity 224 is aft of the aerodynamic center 226 such that, chordwise, the aerodynamic center 226 is between the center of gravity 224 and the sheet center 228. In a traditional rotor blade design, this would result in a dynamically unstable blade and rotor system. However, due to the design of the blade 200, dynamic stability is achieved because the shear center 228 of the blade 200 is forward of the aerodynamic center 226. The locations of the aerodynamic center 226, shear center 228, and center of gravity 224 are dependent on the design of the blade 220, including the design of the spar 210. In the embodiment shown in FIG. 3, the shear center 228 of the blade 200 is moved forward due primarily to the design of the spar 210. The location of the shear center 228 is a function of the relative bending stiffness of the forward portion of the spar 210 compared to the aft section of the spar. If the forward portion manufactured to be stiffer than the aft portion, the shear center is biased in the forward direction.

Figure 4:
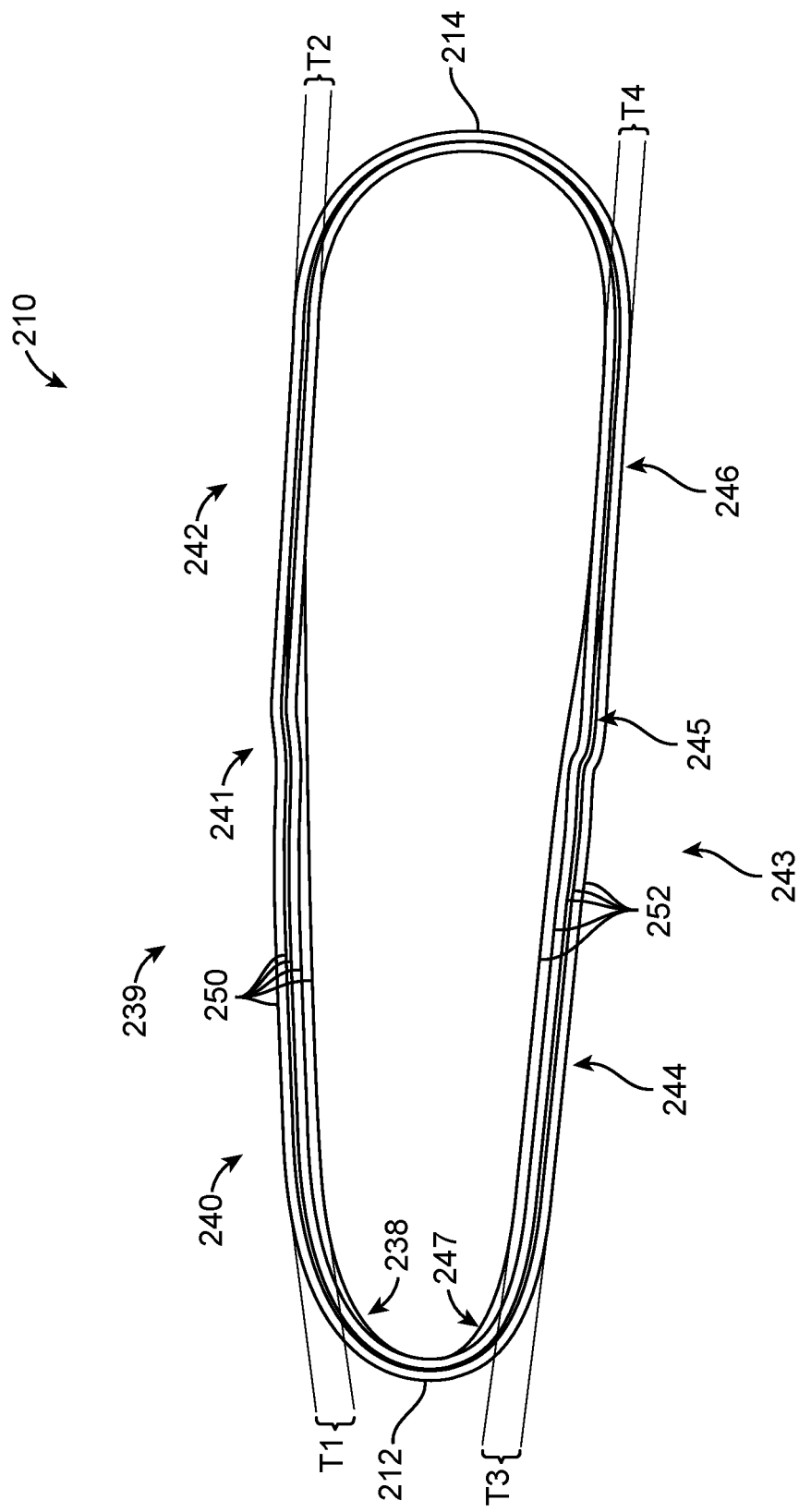
FIG. 4 is a cross-sectional view of a spar of the rotor blade shown in FIG. 3.

Referring to FIG. 4, a cross section of the spar 210 of FIG. 3 is shown in further detail. The spar 210 includes an upper portion 239 and a lower portion 243. The upper portion 239 includes an upper forward portion 240 and an upper aft portion 242. The lower portion includes a lower forward portion 244 and a lower aft portion 246. The spar 210 is manufactured such that the forward portions 240, 244 are stiffer than the aft portions 242, 246. This can be accomplished by increasing the thickness of the forward portions 240, 244 relative to the aft portions 242, 246, using stiffer materials in the forward portions 240, 244 than the aft portions 242, 246, and/or adjusting the location where thicker forward portions 240, 244 taper to thinner aft portions 242, 246. As shown in FIG. 4, the upper and lower forward portion 240, 244 are each thicker than the upper and lower aft portions 242, 246. The thickness of the upper portion 239 tapers prior to the trailing edge 214 at an upper tapered portion 241 from a first thickness T1 at the upper forward portion 240 to a second thickness T2 at the upper aft portion 242. Similarly, the thickness of the lower portion 243 tapers prior to the trailing edge 214 at a lower tapered portion 245 from a third thickness T3 at the lower forward portion 244 to a fourth thickness T4 at the lower aft portion 246. Measuring from the leading edge 212 of the spar 210 to the trailing edge 214 of the spar 210 (e.g., with the leading edge defining a distance of 0% and the trailing edge defining a distance of 100%), the upper and lower tapered portions 241, 245 may begin approximately 55% to approximately 65% of the distance to the trailing edge 214, and may end approximately 65% to approximately 75% of the distance to the trailing edge 214. However, the locations of the tapered portions 241, 245 may be different depending on the relative thicknesses and material stiffness properties of the forward portions 240, 244 compared to the aft portions 242, 246. In some embodiments, thickness T1 may be substantially equal to thickness T3. In some embodiments, thickness T2 may be substantially equal to thickness T4.

Referring again to the conventional blade 100 shown in FIG. 2 for comparison, the upper portion 139 and the lower portion 141 of the conventional spar 110 each have a substantially consistent thickness. In the conventional blade 100, the location of the shear center is not determinative of the dynamic stability of the blade 100 because the center of gravity 124 is forward of the aerodynamic center 126. While this results in a dynamically stable blade, it requires that the blade include the forward weight 120 in order to move the center of gravity 124 forward. Because the design of the spar 210 in the embodiment shown in FIGS. 3 and 4 moves the shear center 228 forward of the aerodynamic center 226, no forward weight is required.

The upper forward portion 240 includes a first plurality of bonded unidirectional plies 250 (e.g., layers), and the lower forward portion 244 includes a second plurality of unidirectional plies 252. "Unidirectional" refers to the orientation of the majority of fibers in the layers. The majority of the fibers are oriented in a zero degree direction parallel to the feathering axis of the blade 200. Each of the plies in the first and second pluralities of plies may be between about $\frac{1}{100}$" thick to about $\frac{1}{70}$" thick, inclusive, in some embodiments, e.g., about $\frac{1}{80}$" thick or $\frac{1}{90}$" thick. The first plurality of plies 250 extend from an upper forward end 238 adjacent the leading edge 212 of the spar 210 to specific locations within the upper tapered portion 241. The second plurality of plies 252 extend from a lower forward end 247 adjacent the leading edge 212 of the spar 210 to specific locations within the lower tapered portion 245.

Figure 5:
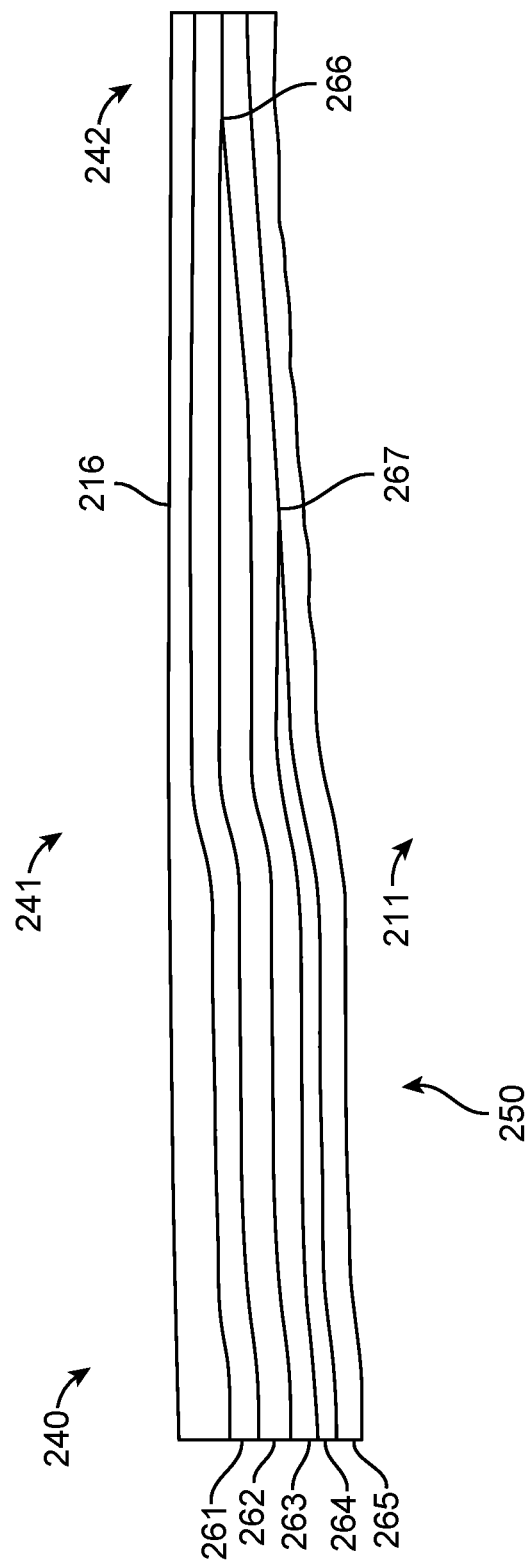
FIG. 5 is a detail view of a portion of the rotor blade shown in FIG. 3.

Referring to FIG. 5, a detail view of a cross section of the upper tapered portion 241 of the spar 210 and the adjacent portion of the upper skin 216 are shown. The upper tapered portion 241 tapers to the upper forward portion 240 to the left and to the upper aft portion 242 to the right. In the embodiment shown, the first plurality of plies includes a first ply pack 261, a second ply pack 262, a third ply pack 263, a fourth ply pack 264, and a fifth ply pack 265. Each ply pack 261, 262, 263, 264, 265 includes a plurality of plies. The first ply pack 261 is bonded to the underside of the upper skin 216. Each successive ply pack is bonded to the previous ply pack forming a layered material extending towards the internal cavity 211. The fourth ply pack 264 tapers and ends at a point 266 as it approaches the upper aft portion 242. The third and fifth ply packs 263, 265 merge together at point 266. The second ply pack 262 tapers and ends at a point 267 as it approaches the upper aft portion 242. The first ply pack 261 and the combined third and fifth ply packs 263, 265 merge together at point 267. Each of the ply packs 261-265 may be about $\frac{1}{20}$" thick to about $\frac{1}{7}$" thick, inclusive, e.g., about $\frac{1}{18}$" or about $\frac{1}{8}$" thick. In some embodiments, the thickness may be determined based on the desired shear center. In some embodiments, the ply pack is a multifilament material, such as a multifilament graphite. The buildup of plies near the forward end of the spar 210 moves the shear center 228 forward until the shear center 228 is forward of the aerodynamic center 226. Various embodiments of the rotor blade 200 may include more or fewer plies than as shown in FIG. 5.

Configuration of Example Embodiments

While this specification contains specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "about," "generally," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the appended claims.

The term "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

It is important to note that the construction and arrangement of the various systems shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the disclosure, the scope being defined by the claims that follow. When the language "a portion" is used, the item can include a portion and/or the entire item unless specifically stated to the contrary.

Various numerical values herein are provided for reference purposes only. Unless otherwise indicated, all numbers expressing quantities of properties, parameters, conditions, and so forth, used in the specification and claims are to be understood as being modified in all instances by the term "about" or "approximately." Accordingly, unless indicated to the contrary, the numerical parameters set forth in the following specification are approximations. Any numerical parameter should at least be construed in light of the number of reported significant digits and by applying ordinary rounding techniques. The term "about" or "approximately" when used before a numerical designation, e.g., a quantity and/or an amount including ranges, indicates approximations which may vary by 10%, 9%, 8%, 7%, 6%, 5%, 4%, 3%, 2%, 1%, or less in either direction (greater than or less than) of the stated reference value unless otherwise stated or otherwise evident from the context (except where such number would exceed 100% of a possible value). It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

What is claimed is:

1. A rotor blade for a rotary wing aircraft, the rotor blade comprising:
   a leading edge and a trailing edge defining a chordwise direction, the leading edge defining a forward end of the rotor blade and the trailing edge defining an aft end of the rotor blade,
   the rotor blade having a center of gravity, a shear center, and an aerodynamic center along the chordwise direction, wherein the center of gravity is aft of the aerodynamic center, and the shear center is forward of the aerodynamic center.

2. The rotor blade of claim 1, wherein the rotor blade is dynamically stable.

3. The rotor blade of claim 1, further comprising a spar with a substantially oval cross section, the spar comprising:
   an upper portion comprising an upper forward portion having a first thickness and an upper aft portion having a second thickness; and
   a lower portion comprising a lower forward portion having a third thickness and a lower aft portion having a fourth thickness,
   wherein the first thickness is larger than the second thickness, and the third thickness is larger than the fourth thickness.

4. The rotor blade of claim 3, wherein the first thickness is substantially equal to the third thickness and the second thickness is substantially equal to the fourth thickness.

5. The rotor blade of claim 3, wherein the rotor blade comprises a conduit between the spar and the leading edge of the rotor blade, the conduit being shaped to receive an electrical harness.

6. The rotor blade of claim 3, wherein the upper forward portion comprises a first plurality of plies and the lower forward portion comprises a second plurality of plies.

7. The rotor blade of claim 6, wherein each of the plies in the first and second pluralities of plies is above about 0.010 inches thick and below about 0.014 inches thick.

8. The rotor blade of claim 6, wherein:
   the upper portion of the spar comprises an upper tapered portion positioned between the upper forward portion and the upper aft portion, and each of the plies in the first plurality of plies extends from an upper forward end of the upper forward portion to the upper tapered portion; and
   the lower portion of the spar comprises a lower tapered portion positioned between the lower forward portion and the lower aft portion, and each of the plies in the second plurality of plies extends from a lower forward end of the lower forward portion to the lower tapered portion.

9. The rotor blade of claim 8, wherein the upper portion of the spar tapers from the first thickness to the second thickness within the upper tapered portion, and wherein the lower portion of the spar tapers from the third thickness to the fourth thickness within the lower tapered portion.

10. The rotor blade of claim 8, wherein:
    the upper tapered portion and the lower tapered portion each begin at a respective position between about 55% and about 65% of the distance to an aft end of the spar measured from a forward end of the spar; and
    the upper tapered portion and the lower tapered portion each end at a respective position between about 65% and about 75% of the distance to the aft end of the spar measured from the forward end of the spar.

11. The rotor blade of claim 1, further comprising:
    a spar; and
    a leading edge sheath coupled to the spar and defining the leading edge, the leading edge sheath and the spar forming a cavity therebetween,
    wherein the cavity is structured to extend at least from an inboard portion of the rotor blade to an outboard portion of the rotor blade.

12. The rotor blade of claim 11, further comprising a conduit disposed in the cavity.

13. The rotor blade of claim 12, wherein the conduit is shaped to house an electrical harness to provide electricity from the inboard portion of the rotor blade to the outboard portion of the rotor blade.

* * * * *